US006943508B2

(12) United States Patent
Morris et al.

(10) Patent No.: US 6,943,508 B2
(45) Date of Patent: Sep. 13, 2005

(54) TUBULAR LINEAR SYNCHRONOUS MOTOR CONTROL FOR ELEVATOR DOORS

(75) Inventors: Nigel Bruce Morris, Cromwell, CT (US); Christophe Durand, Cernoy en Berry (FR); Levent Gosterisli, Bloomfield, CT (US); Thomas He, Unionville, CT (US); Pascal Rebillard, Gien (FR); Vlad Zaharia, Rocky Hill, CT (US)

(73) Assignee: Otis Elevator Company, Farmington, CT (US)

( * ) Notice: Subject to any disclaimer, the term of this patent is extended or adjusted under 35 U.S.C. 154(b) by 115 days.

(21) Appl. No.: 10/252,865

(22) Filed: Sep. 23, 2002

(65) Prior Publication Data

US 2004/0055829 A1 Mar. 25, 2004

(51) Int. Cl.[7] .................................................. H02K 41/02
(52) U.S. Cl. .......................... 318/38; 187/316; 318/135
(58) Field of Search ................................ 187/289, 313, 187/315–317; 318/135, 38, 41, 45, 47, 49, 68, 101–103, 473; 310/12–14; 49/118, 360

(56) References Cited

U.S. PATENT DOCUMENTS 3,860,840 A * 1/1975 Laronze ........................ 310/13
4,857,786 A * 8/1989 Nihei et al. ............ 310/156.38
4,876,765 A * 10/1989 Karita .......................... 16/102
5,373,120 A * 12/1994 Barrett et al. ............... 187/316
5,612,518 A * 3/1997 Jaminet et al. ............. 187/316
5,613,188 A * 3/1997 Piech et al. ................. 428/547
5,751,076 A * 5/1998 Zhou ............................ 310/12
5,808,246 A * 9/1998 Peruggi et al. ............. 187/316
5,808,381 A * 9/1998 Aoyama et al. .............. 310/12
5,862,887 A * 1/1999 Swaybill et al. ............ 187/313
5,949,036 A * 9/1999 Kowalczyk et al. ........ 187/316
6,467,584 B2 * 10/2002 Yamamoto et al. ......... 187/316
6,742,631 B2 * 6/2004 Grundmann ................ 187/315
2002/0112410 A1 * 8/2002 Zhou et al. .................... 52/30

FOREIGN PATENT DOCUMENTS

EP 0841286 A1 5/1998
JP 03264486 A * 11/1991 ........... B66B/13/08
JP 04350086 A * 12/1992 ........... B66B/13/08
WO WO 96/24189 * 8/1996

* cited by examiner

*Primary Examiner*—Jonathan Salata
(74) *Attorney, Agent, or Firm*—Bachman & LaPointe, P.C.

(57) ABSTRACT

An apparatus for effecting non-contact linear door displacement comprising a tubular motor formed of a stator (1) formed from a plurality of magnets (21) arranged along a linear axis (15), and at least one thrust block (3) each formed of at least one electrically conductive coil encircling the stator (1) at a distance sufficient to facilitate electromechanical interaction between the plurality of coils and the stator (1), at least one door (5) attached to at least one of the plurality of thrust blocks (3) via a hanger (9) and the at least one door (5) capable of a movement in the direction of the linear axis (15), a rolling component (11) to enable movement of the hanger (9) in the direction of the linear axis (15), and a control mechanism (70) for sensing the position of each of the at least one door (5) and issuing an electrical control signal to each of the plurality of thrust blocks (3) so as to affect the movement of the at least one door (5).

13 Claims, 6 Drawing Sheets

TUBULAR LINEAR SYNCHRONOUS MOTOR CONTROL FOR ELEVATOR DOORS

BACKGROUND OF THE INVENTION (1) Field of the Invention

The present invention relates to tubular linear synchronous motor (TLSM) door assembly for providing motive force to a door or doors. More specifically, this invention relates to an apparatus incorporating a TLSM with control circuitry to provide sensor-less control of an elevator door configuration.

(2) Description of Related Art

Use of motor assemblages and associated control mechanisms for accomplishing the automated opening and closing of doors is well known. Such assemblages are often found in the context of elevators wherein their arrangement gives rise to concerns regarding efficiency, noise, lifetime, and maintenance of the assemblage.

Common door control implementations require a sensing apparatus, such as an optical sensor, for determining the precise location of a door or doors at all times. While optical sensors can be used to determine the position of a door to within fractions of a millimeter, traditional elevator door implementations require an accuracy only on the order of a millimeter or so.

What is needed therefore is a mechanism for operating doors, particularly elevator doors, in a non-contact manner. By non-contact, it is meant that operation of the motor does not result in the physical contact by, movement of, and resulting friction between moving parts. It would likewise be advantageous for such a system to provide continuous monitoring of the position of the door or doors without the need for expensive and maintenance intensive sensors.

SUMMARY OF THE INVENTION

Accordingly, it is an object of the present invention to provide a tubular linear synchronous motor (TLSM) door assembly for providing motive force to a door or doors.

It is a further object of the present invention to provide a method for controlling such a door assembly.

In accordance with the present invention, an apparatus for effecting non-contact linear door displacement comprises a tubular motor comprising a stator formed from a plurality of magnets arranged along a linear axis, and at least one thrust block each comprising at least one electrically conductive coil encircling the stator at a distance sufficient to facilitate electromagnetic interaction between the plurality of coils and the stator, at least one door attached to at least one of the plurality of thrust blocks via a hanger and the at least one door capable of a movement in the direction of the linear axis, a rolling means to enable movement of the hanger in the direction of the linear axis, and a control mechanism for sensing the position of each of the at least one door and issuing an electrical control signal to each of the plurality of thrust blocks so as to affect the movement of the at least one door.

In accordance with the present invention, an apparatus for controlling tubular linear synchronous motor doors comprises a master-slave control circuit capable of measuring an actual master position of a master door having a master status and an actual slave position of a slave door having a slave status, a position control profile accessible to the master-slave control circuit, component capable of comparing the measured actual master position to the position control profile to compute a master position error, component capable of calculating a master electrical force from the computed master position error, component capable of transmitting the calculated master electrical force to the master door, component capable of providing as an input the actual master position to the slave door, component capable of measuring an actual slave position of the slave door, component capable of comparing the measured actual slave position to the inputted actual master position to compute a slave position error using the computed slave position error to calculate a slave electrical force, component capable of transmitting the calculated slave electrical force to the slave door, and component capable of toggling or without toggling the status of the slave door and the master door when an absolute value of the slave position error exceeds a predefined threshold.

In accordance with the present invention, a method for controlling elevator mounted tubular linear synchronous motor doors comprises the steps of inputting a position control profile to a master-slave control circuit, measuring an actual master position of a master door having a master status, providing as an input to the master door the position control profile, comparing the measured actual master position to the position control profile to compute a master position error, using the computed master position error to calculate a master electrical force, transmitting the calculated master electrical force to the master door, recomputing the actual master position, providing as an input the actual master position to a slave door having a slave status, measuring an actual slave position of the slave door, comparing the measured actual slave position to the inputted actual master position to compute a slave position error using the computed slave position error to calculate a slave electrical force, transmitting the calculated slave electrical force to the slave door, and toggling the status of the slave door and the master door when an absolute value of the slave position error exceeds a predefined threshold.

DETAILED DESCRIPTION OF THE PREFERRED EMBODIMENT(S)

Figure 1:
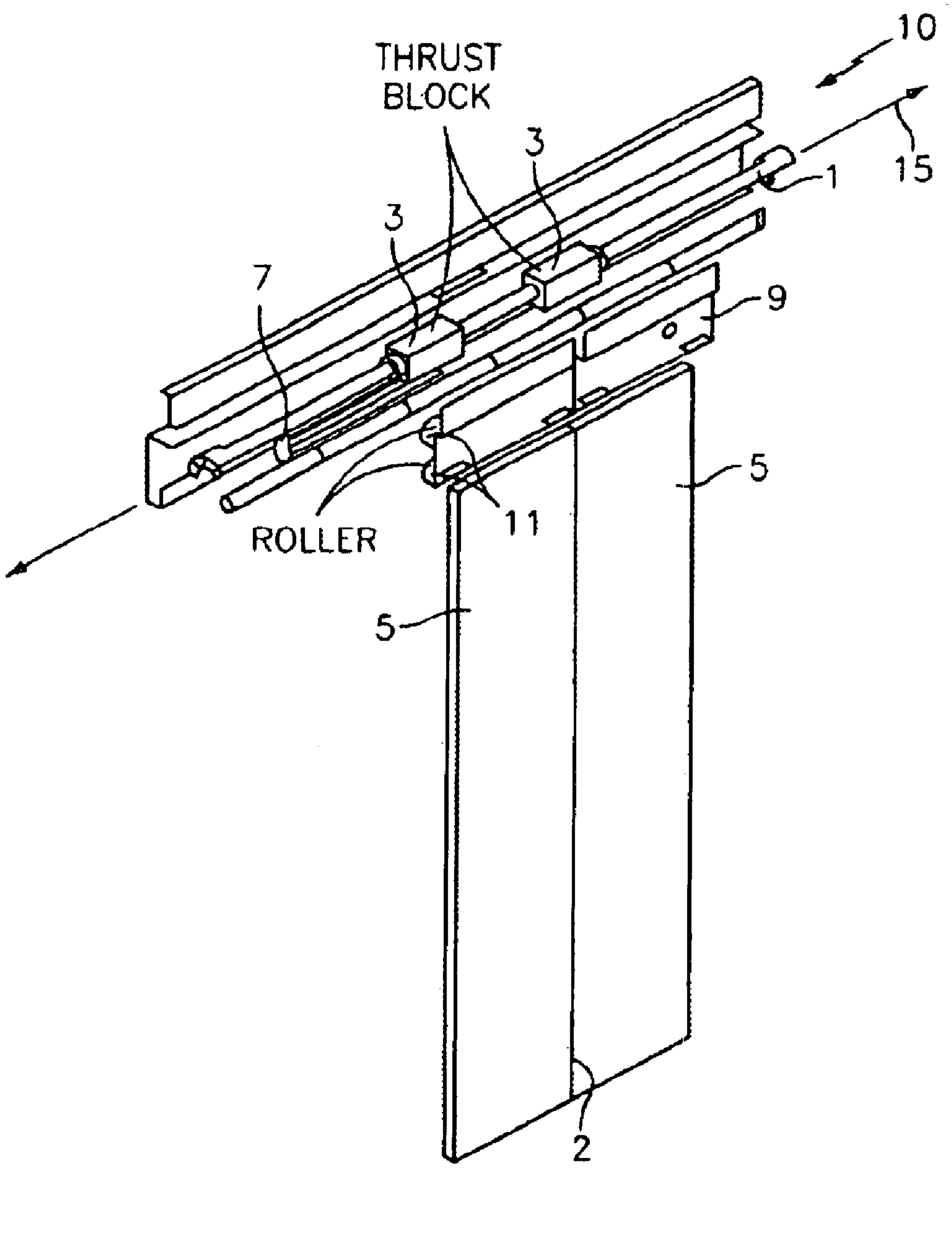
FIG. 1 A perspective view of the door apparatus of the present invention.

With reference to FIG. 1, there are illustrated the primary elements of the door apparatus of the present invention. While illustrated with respect to embodiments comprising configurations of elevator doors, the present invention is not so limited. Rather, the present invention is drawn broadly to include any moving or stationary platform upon which the non-contact, linear door displacement apparatus of the present invention may be mounted. In addition, while there is illustrated a preferred embodiment of the present invention in which two doors are displaced along a linear axis in opposing directions about a center line 2, the present invention may be likewise utilized to move a single door or a door within a door such as in a telescoping configuration.

Motive force is applied to doors 5, through the use of a tubular linear synchronous motor (TLSM). In a preferred embodiment, a TLSM is comprised of a stator 1 and at least one thrust block 3 comprised of a plurality of coils. However, the present invention is drawn broadly to encompass a door assembly wherein the magnetic rod previously described as forming a stator 1 functions as the moving part and the thrust block remains stationary. In such an instance, the thrust block becomes the stator. As will be described more fully later, application of an electrical current through the coils results in motion by the thrust block 3 along the stator 1 in the direction of linear axis 15. In a preferred embodiment, a single door 5 is attached to a single thrust block 3. As a result, motion of the thrust block along the stator 1 results in a corresponding motion of a single door 5. Electric current is provided to the coils of thrust block 3 through electrical connection 7. Electrical wires forming coils wrap around stator 1, but are not in physical contact with stator 1. In addition, while doors 5 hang from door apparatus 10, they do not exert a substantial downward force upon thrust block 3. Rather, doors 5 are connected to thrust blocks 3 via hangers 9. Hanger 9 is comprised of a plurality of rollers 11. In a preferred embodiment, a rolling means comprising rollers 11 are mated so as to be in contact both above and below a guide rail not pictured. Guide rails are oriented to extend in the same direction as linear axis 15 and as such serve to support the downward pull of the doors 5, hanger 9 and rollers 11.

Figure 2:
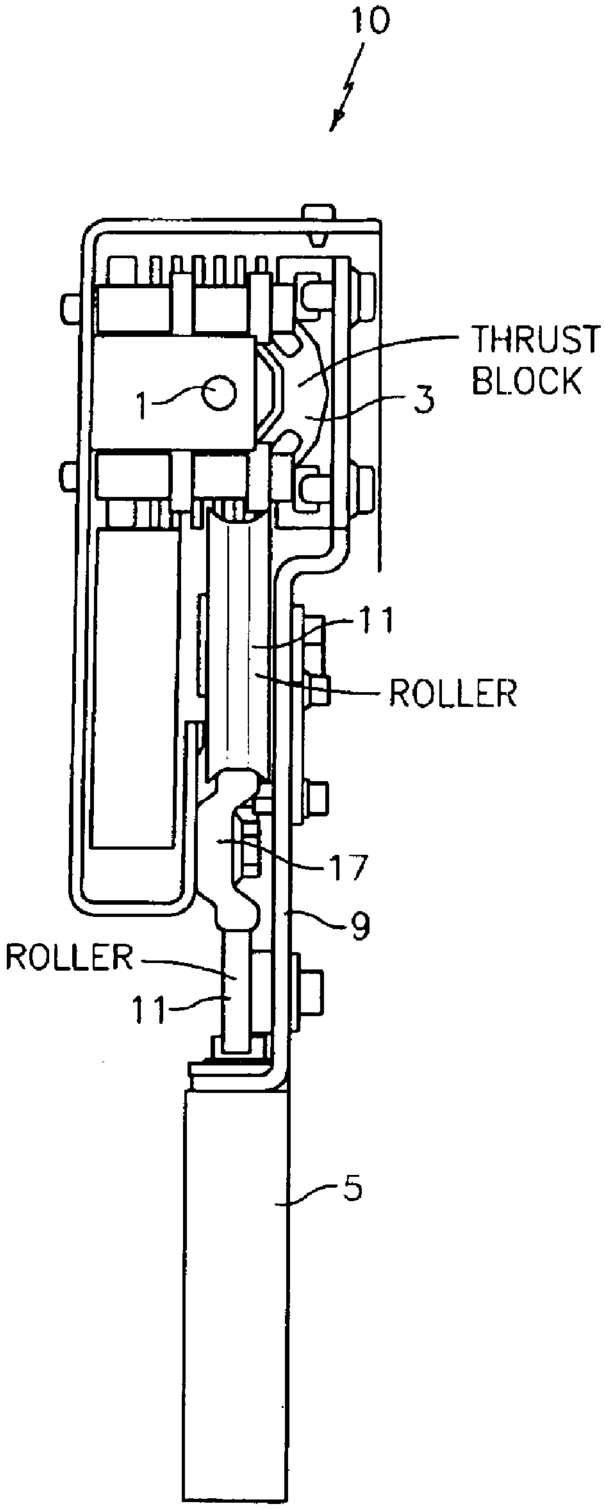
FIG. 2 A side view of the door apparatus of the present invention.

With reference to FIG. 2, there is illustrated a side view of door apparatus 10. In this view, stator 1 as well as linear axis 15 extends perpendicular to the page. Rollers 11 can be seen to be mated about guide rail 17. Doors 5 are connected to thrust blocks 3 via hanger 9.

Figure 4:
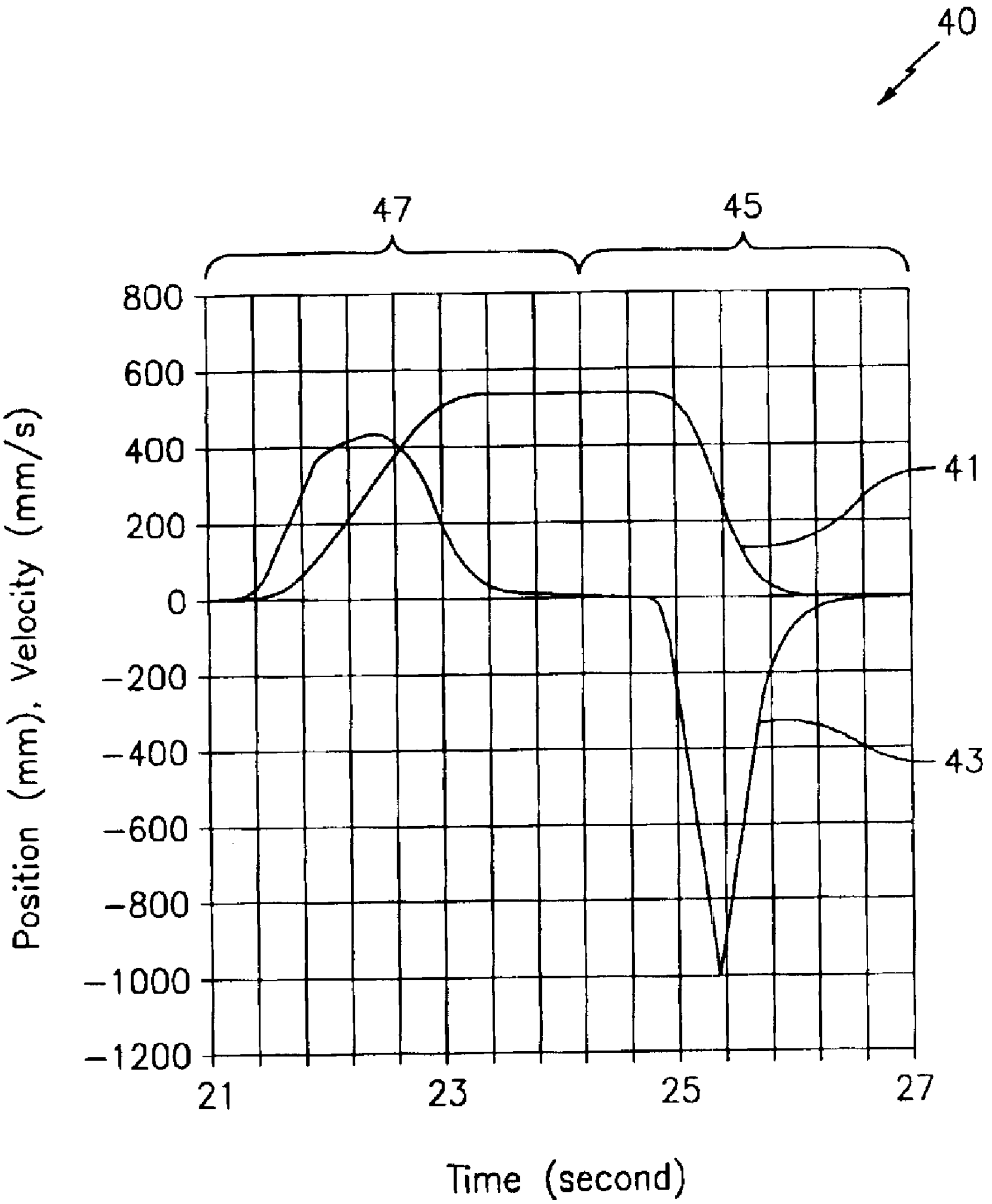
FIG. 4 A position control profile of the present invention.

With reference to FIG. 4, there is illustrated an exemplary position control profile 40 of a single door. Position control profile 40 is comprised of data detailing the position of a door 5 as a function of time. Position control profile 40 consists of door close portion 47 and door open portion 45. As illustrated, a door 5 resting in a fully open position is defined to be at rest at a displacement of 0 millimeters. In the present example, a door 5 resting in the fully closed position resides at approximately 550 millimeters, or 0.55 meters. As defined, a positive movement in position occurs when the door 5 moves towards a closed position and, conversely, a negative movement in position occurs when the door 5 moves towards an open position. Therefore, the process of opening a door 5 to its fullest extent results in a displacement along linear axis 15 of approximately 0.55 meters. Position control profile 40 may be stored in any medium capable of outputting the data comprising position control profile 40 in an electronic format.

When two such doors 5 are displaced in opposing directions along linear axis 15, the resulting opening is approximately 1.1 meters about a center point. At the beginning of door open portion 45, the door's position is at approximately 550 millimeters and its velocity is 0 mm/sec as the door is still at rest. As is evident, the velocity of door 5 tends quickly towards the negative reaching a maximum of negative 1,000 millimeters (or negative 1 meter) per second before rapidly increasing to a velocity of 0 meters per second at a time when the position of door 5 is at 0 millimeters displaced for a fully open position. In the above noted example, a period of time elapsing between when door 5 first begins to open until door 5 reaches its maximum open position, is approximately 4 seconds. Similarly, door close portion 47 illustrates the position and velocity profile for a door 5 when closing. As can be seen, door 5 experiences a positive velocity attaining a maximum of approximately 400 millimeters per second before decreasing to 0 velocity when the door 5 is at its fully closed position of approximately 0.55 meters.

While it is aesthetically pleasing and psychologically reassuring for an elevator door to open at much greater velocity than it closes, the position control profile 40 of the present invention may be comprised of any profile of position and velocity sufficient to fully define the position and velocity of a door 5 from a fully closed to a fully open position and back again to its fully closed position.

Figure 5:
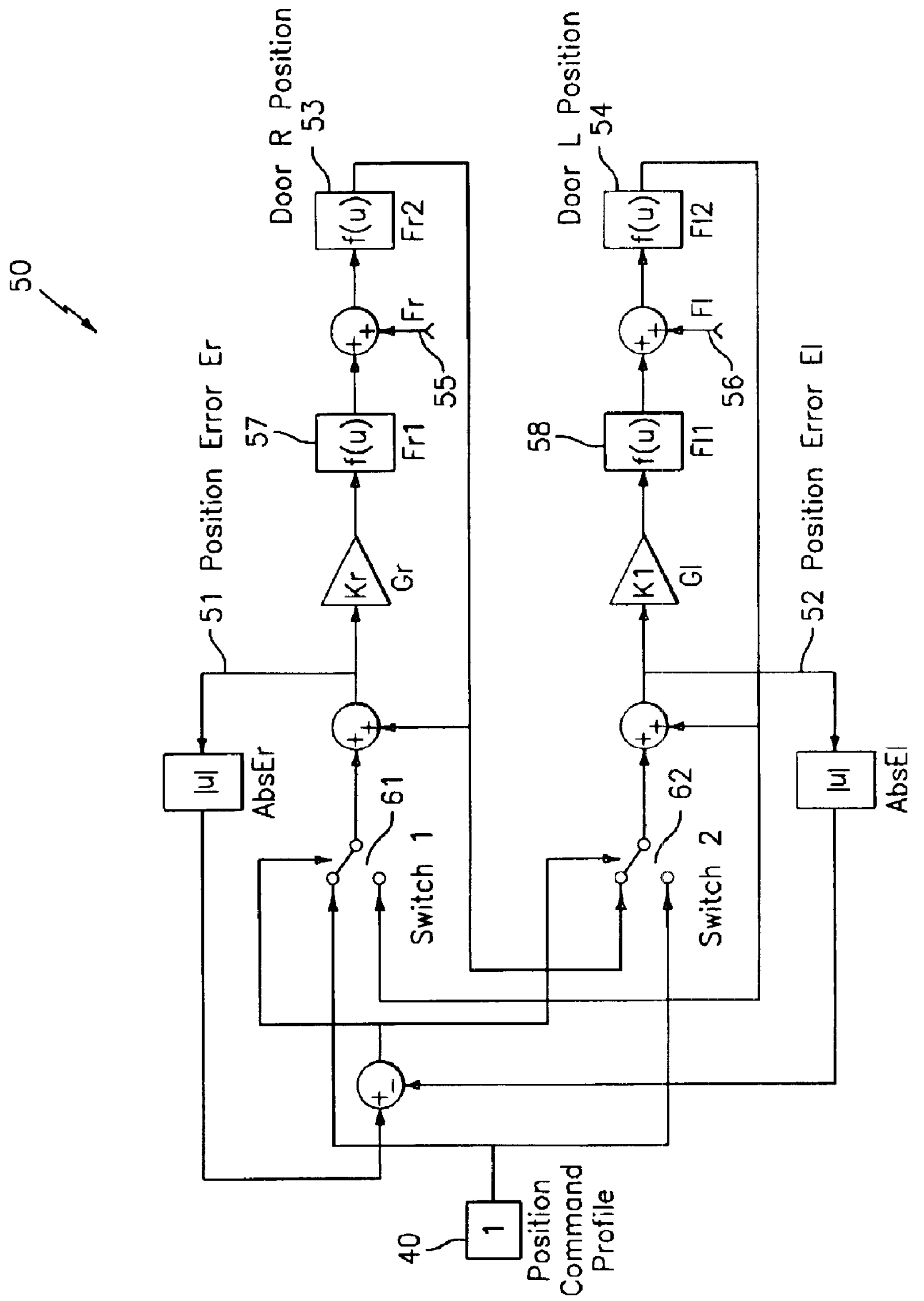
FIG. 5 Schematic diagram of the master-slave circuit of the present invention.

With reference to FIG. 5, there is illustrated the manner in which the position profile of FIG. 4 is used to control the opening and closing of doors 5 in the present invention. FIG. 5 is a logical diagram illustrating the manner in which the position profile is utilized to monitor the position of a first and second, or right and left, doors 5 such that their movement is synchronized.

Door systems involving two doors opening and closing in unison about a center line traditionally utilize mechanical linkages between the two doors. As a result of such a mechanical linkage, cessation of movement in one door results in a similar cessation in the other door.

In the present invention, however, such a physical linkage is not present between the first and second doors 5. Therefore, in the event that motion of one of the doors 5 is impeded, the opposing door could potentially continue to close. Such behavior is unacceptable in many contexts particularly in those involving elevator door apparatus. In the specific case of elevators, it is preferable that the stoppage of any one door's movement, likely as a result of human interference, result in the immediate cessation of movement by both doors and preferably a return to a fully open position.

One methodology for achieving the opening and closing of two doors 5 as utilized by the present invention, involves the implementation of a master slave control relationship. In a master slave control situation, one door is accorded the status of the master, while the other door is accorded the status of the slave. As a result of this relationship, the position of the master door is controlled by a centralized control mechanism. In a preferred embodiment, the centralized control mechanism comprises a master-slave circuit for managing the master/slave relationship and a motor servo control circuit for sensing the position of each door and outputting electrical commands in response thereto as defined more fully below. In a preferred embodiment, centralized control mechanism utilizes the position control profile 40 of the present invention to control the position and velocity of the right door. At the same time, the control system would operate to insure that the left door's position precisely mirrors that of the right door operating as the master. Therefore, in the event that the movement of the right door is impeded the movement of the slave, or left door, will similarly stop in response to the cessation of movement of the right door.

Such a control system, however, experiences a failure in the present instance if the door whose movement is impeded is in fact the left hand, or slave, door 5. In such an event, the movement of the slave door is impeded. However, the control system receives no feed back upon which to take action to restrict the movement of the master door 5. In addition, as the master door 5 continues to proceed to its closed position, slave door 5 is issued repeated commands to alter its position to match that of master door 5. As a result of this scenario, impeding the movement of the slave door does nothing to stop the movement of the master door 5 nor does it alter the system's attempts to continue to close the slave door 5.

It is therefore an essential feature of the control mechanism of the present invention to provide a methodology whereby a master slave control implementation may be achieved such that impedance of the movement of either the master or the slave door results in the immediate cessation of movement of both doors, and the opening thereof to a fully open position. This is achieved by switching the designation of which of left and right doors 5 is the master or the slave dependent upon circumstances encountered in the process of closing the doors 5.

At the beginning of each door's 5 opening and closing cycle, one, and only one, door 5 is assigned the master designation with the other door 5 assuming the role of slave. When one of the doors 5 is impeded, a switch operates to designate the impeded door the master door 5, thus making the other door 5 the slave door. If the impeded door 5 is already designated the master, no adjustment is made. If, however, the impeded door 5 is the slave door 5, the status of both doors toggles.

In continued reference to FIG. 5, there is illustrated in schematic form the interaction of circuit elements which function to implement the master slave control implementation of the present invention. Position control profile 40 serves as the input to master-slave circuit 50. In a preferred embodiment, the same position control profile 40 can be utilized to drive both doors or drive the master door. As defined above, both doors occupy a position at 0 mm when fully open, and proceed to a positive position when closing. Defining each door's 5 position by its own reference system permits the use of a single position control profile 40 for a plurality of doors moving in opposing directions.

In the example illustrated in FIG. 5, the right door bears the designation of the master door and is described herein as such. As is evident, the operation of the left and right doors 5 is logically symmetric. Therefore, it is evident that when the status of both doors is toggled (from master-to-slave and from slave-to-master), the operation of the master-slave circuit 50 proceeds as describes herein with the exception that the left door 5 is the master door 5.

The position control profile 40 serves as an input to control the position of the master door or, as in this example, the right door 5. The predicted position of the door 5 defined by the position control profile 40 is compared to the actual master door position 53. Actual master door position 53 is continually calculated as described below. Comparing actual master door position 53 to the predicted position of the door 5 results in a master position error 51. The absolute value of master position error 51 is compared to the absolute value of slave position error 52. In addition, actual master door position 53 serves as the input to control the position of the slave door 5. Note that actual slave door position 54 is similarly continually calculated or measured and compared to the inputted actual master door position 53. Actual slave door position 54 is calculated in an encoder-less configuration, and measured when implemented using an encoder.

By comparing the predicted position of the master door 5 to the actual master door position 53, master-slave circuit 50 can calculate an electrical force 57 which must be applied to master door 5 so as to bring actual master door position 53 into correspondence with its desired position as detailed in the position control profile 40. As a result of the computed electrical force 57, an electrical signal is sent through electrical connection 7 into the coil or coils housed in thrust box 3 corresponding to the master door 5. The electrical signal sent over the electrical connection to the coil results in an electromotive force causing the master door to accelerate. This generated electromotive force is combined with a disturbance force such as friction, obstruction 55 and used to recompute the actual master door position 53.

Similarly, master-slave circuit 50 calculates an electrical force 58 which must be applied to slave door 5 so as to bring actual slave door position 54 into correspondence with its desired position as defined by the inputted actual master door position 53. As a result of the computed electrical force 58, an electrical signal is sent through electrical connection 7 into the coil or coils corresponding to the slave door 5. The electrical signal sent over the electrical connection to the coil results in an electromotive force causing the slave door to accelerate. This generated electromotive force is combined with physical force 56 generated by the resistance of the door to movement and used to recompute the actual slave door position 53.

In the event that the slave position error 52 exceeds a threshold value, most probably due to encountering a physical obstruction, master-slave circuit 50 toggles switches 61,62 thus switching the master/slave status of each door 5. In the event that the master position error 51 exceeds a threshold value, most probably due to encountering a physical obstruction, master-slave circuit 50 does not toggle the status of the doors 5. In a preferred embodiment, exceeding the threshold value by either door 5 will result in inputting a portion of position control profile 40 to master door 5 corresponding to stopping or opening the doors 5.

Figure 3:
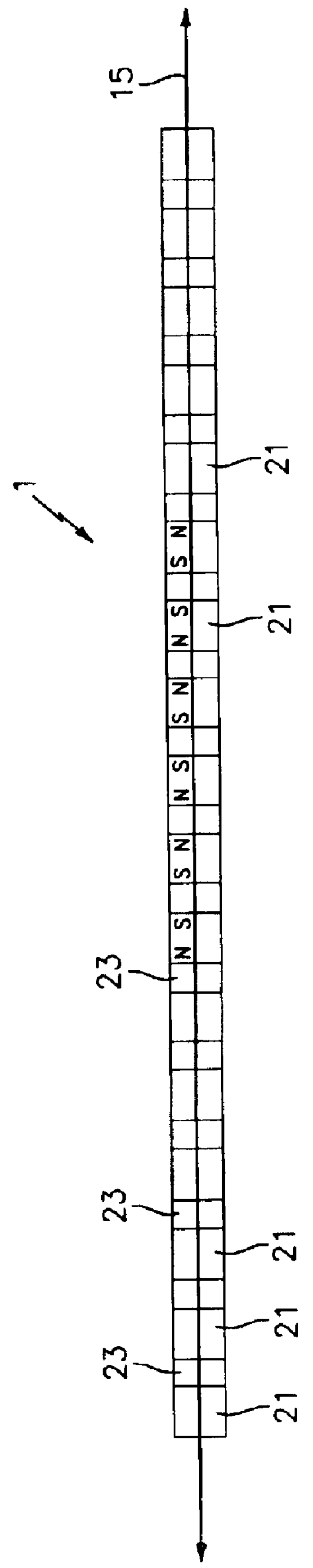
FIG. 3 A diagram showing the configuration of magnets and dividers forming the stator of the present invention.

With reference to FIG. 3, there is illustrated a permanent magnet rod forming stator 1. Stator 1 is comprised of a plurality of permanent magnets 21 arranged along linear axis 15 interspersed with dividers 23. The north and south poles of permanent magnets 21 are arranged in N-S, S-N, N-S, etc. configuration. In a preferred embodiment, the thrust block 3 surrounding stator 1 has a wire coil with six poles. However, the pole number may be more or less depending on the desired door speed in operation.

As illustrated previously in FIGS. 1 and 2, there are preferably two tubular motor thrust blocks 3 for controlling a two-door, centered elevator door system. Each thrust block attaches to and drives one door 5.

A single tubular motor thrust block 3 can similarly control a single panel door or a two speed telescoping door system. A single panel door system requires only one tubular motor thrust block 3. A two speed door telescoping door system may incorporate two thrust blocks with differing position control profiles.

Figure 6:
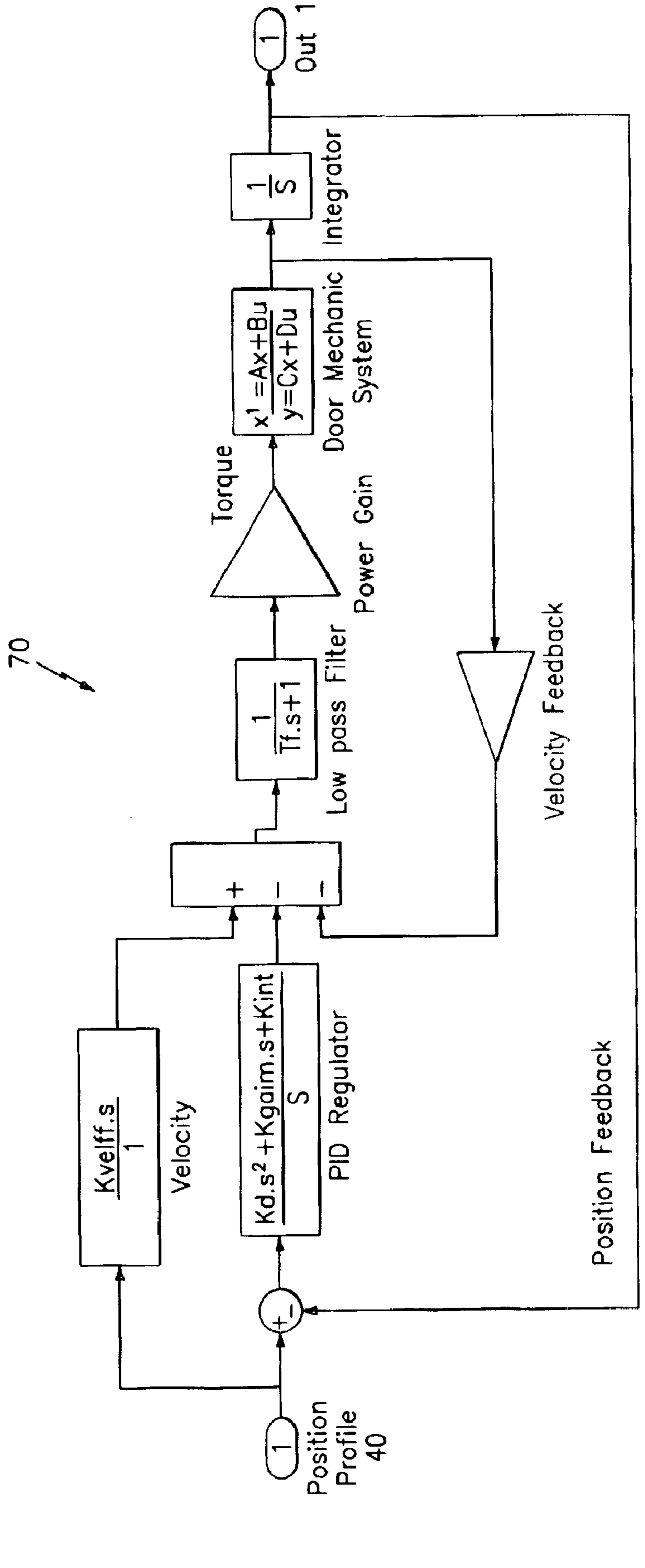
FIG. 6 A schematic diagram of the motor servo control system of the present invention.

With reference to FIG. 6, there is illustrated the motor servo control system 70 of the present invention. Motor servo control system 70 is a three-loop control system: motor current control, motor velocity control and motor position control. The motor current control loop is shown as a simplified block labeled "power gain".

The motor current control system has a frequency bandwidth of about 3000 Hz shown. Because an elevator door can be heavy, the velocity control system and the position control system require a frequency bandwidth of only about 2 Hz. Below 20 Hz the closed current loop can be seen as a constant unit gain. This means that the torque command equals to the torque output below 20 Hz.

There are several methods to indirectly measure the thrust block 3 position, and hence the position of the door 5 connected thereto. The position measurement of a thrust block 3 can be direct or indirect. The present invention can be implemented by direct position measurement or indirect measurement. The direct method has one or more sensor(s)

to detect position of thrust block(s) 3. Those sensors can be magneto-electric, mechanical, optical, infrared, capacitance and laser.

One well-known indirect method is to use the phase back electromotive force (EMF) to detect the thrust block position. The trapezoidal commutation control has been a particularly appealing target for this effort because one of its three stator phases is unexcited during each 60 electrical interval, making it possible to conveniently use the back EMF generated in the unexcited phase as a position sensing signal. A variety of specific algorithms have been developed which use back EMF voltage measurements to determine the electronic commutation instants for trapezoidal control motor. These schemes have been successfully implemented in integrated circuits and are now in commercial production.

Position sensor elimination in a sinusoidal control motor is more challenging because all three-machine phases are continuously excited. Therefore, more sophisticated observer estimation techniques are generally required to extract position information from phase current and voltage measurements.

In order to increase efficiency and obtaining maximum torque per current for a wider speed range an alternative way to acquire the third harmonic voltage signal can be processed and protected position. This method is not sensitive to filtering delays, allowing the motor to achieve desired performance over a wide speed range. Moreover, such a method does not require access to the stator neutral terminal. This is particularly appealing when the tubular motor neutral connection is not available or is expensive to implement.

The phase inductance of the permanent magnets 23 vary appreciably as a function of the thrust block position 3. Calculated phase inductance can be used to estimate the position of the thrust block 3 and used as an input to master/slave circuit 50. In order to obtain an unambiguous relation between the phase inductance and the thrust block position, the phase inductance phases a, b, and c are calculated during different segments of each electrical cycle. In the present invention the calculated phase inductance is used to determine the coil position in the thrust block 3, which corresponds to the door 5 position.

The apparatus and method of the present invention allows for controlling the movement of doors, particularly those used in operation with elevators, wherein there exists no mechanical linkage between the doors. The use of a tubular linear synchronous motor to produce electromotive force eliminates the need to convert rotary engine motion into linear door motion. In addition, such an arrangement obviates the need to install and maintain expensive position sensors for determining the position of the doors. Rather, phase back electromotive force (EMF) is used to detect the position of the door or doors. As a result, there are required fewer parts to accurately ascertain the position of the doors. Lastly, the implementation of a master-slave relationship between the doors provides for the safe and advantageous operation of the doors lacking a mechanical linkage.

It is apparent that there has been provided in accordance with the present invention a tubular linear synchronous motor (TLSM) door assembly for providing motive force to a door or doors which fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. An apparatus for effecting non-contact linear door displacement comprising:

first and second doors;

a stator formed from a plurality of magnets arranged along a linear axis;

means for moving said first door and said second door along a direction parallel to said linear axis;

said moving means comprising a first thrust block attached to said first door and a second thrust block attached to said second door;

each of said thrust blocks comprising at least one electrically conductive coil encircling said stator;

means for controlling movement of said doors, said controlling means comprising means for sensing an impedance of movement of one of said doors and means for transmitting a signal to said moving means to stop motion of said doors in response to a sensed impedance and for designating an impeded door as being a master door.

2. The apparatus of claim 1 wherein said stator (1) further comprises a plurality of dividers (23), each of said dividers (23) having a substantially uniform length and being positioned along said linear axis (15) between adjacent ones of said neighboring magnets (21).

3. The apparatus of claim 1 wherein said stator (1) is stationary mounted with respect to said at least one electrically conductive coil.

4. The apparatus of claim 1 comprising one of said doors (5) having two door segments operating in telescoping fashion.

5. The apparatus of claim 1 wherein said apparatus is mounted in an elevator.

6. The apparatus of claim 1 further comprising said at least one door (5) being attached to said at least one thrust block (3) via a hanger (9) and a rolling means (11) to enable movement of said hanger (9) in the direction of said linear axis (15).

7. An apparatus according to claim 6, further comprising a guide rail and said rolling means comprising a first roller positioned above and in contact with said guide rail and a second roller positioned below and in contact with said guide rail.

8. An apparatus according to claim 1, wherein said movement controlling means further comprises means for controlling movement of a first one of said doors by a position control profile.

9. An apparatus according to claim 8, wherein said movement controlling means further comprises means for comparing actual position of said first one of said doors with said position control profile and for generating a signal to be transmitted by said transmitting means to said moving means to cause movement of said first one of said doors.

10. An apparatus according to claim 9, wherein said movement controlling means further comprises means for comparing actual position of a second one of said doors with said actual position of said first one of said doors and for generating an additional signal to be transmitted by said transmitting means to said moving means to cause movement of said second one of said doors.

11. An apparatus according to claim 1, wherein said sensing means comprises means for insuring that a position of said first door is identical to a position of said second door.

12. An apparatus according to claim 1, wherein said sensing means comprises means for sensing thrust block position.

13. An apparatus according to claim 1, wherein said movement controlling means comprises a master-slave circuit wherein one of said doors is designated as a master door and a second of said doors is designated as a slave door.

* * * * *